United States Patent
Nakamura et al.

(10) Patent No.: US 7,939,458 B2
(45) Date of Patent: May 10, 2011

(54) REFRACTORY BRICK

(75) Inventors: Ryosuke Nakamura, Tokyo (JP); Hiroyuki Shikama, Tokyo (JP); Hisashi Tomiya, Tokyo (JP); Hisaharu Sasaki, Tokyo (JP)

(73) Assignee: Shinagawa Refractories Co., Ltd., Tokyo (JP)

( * ) Notice: Subject to any disclaimer, the term of this patent is extended or adjusted under 35 U.S.C. 154(b) by 218 days.

(21) Appl. No.: 12/094,938

(22) PCT Filed: Nov. 24, 2006

(86) PCT No.: PCT/JP2006/323480
§ 371 (c)(1),
(2), (4) Date: May 23, 2008

(87) PCT Pub. No.: WO2007/061070
PCT Pub. Date: May 31, 2007

(65) Prior Publication Data
US 2009/0286668 A1 Nov. 19, 2009

(30) Foreign Application Priority Data

Nov. 25, 2005 (JP) .................................. 2005-380989

(51) Int. Cl.
*C04B 35/101* (2006.01)
*C04B 35/443* (2006.01)
(52) U.S. Cl. ........................................ 501/120; 501/128
(58) Field of Classification Search .................. 501/119, 501/120, 128
See application file for complete search history.

(56) References Cited

U.S. PATENT DOCUMENTS 3,879,210 A * 4/1975 LaBar .......................... 501/128
7,182,891 B2 * 2/2007 Bugajski et al. ................ 264/30

FOREIGN PATENT DOCUMENTS

| JP | 50-7611 B | 3/1975 |
| JP | 52-14724 B | 4/1977 |
| JP | 63-151661 A | 6/1988 |
| JP | 6-144922 A | 5/1994 |
| JP | 8-109062 A | 4/1996 |
| JP | 9-328357 A | 12/1997 |
| JP | 2000-119061 A | 4/2000 |
| JP | 2000-272956 A | 10/2000 |
| JP | 2003-145265 A | 5/2003 |

OTHER PUBLICATIONS

Machine translation of JP 08-109062, Apr. 1996.*
Koji Ide et al: "Expansion Behavior of Al2O3-MgO Castables" XV. Conference on Refractory Castables, No. ISNBN8002017277, May 25, 2005 pp. 42-49, XP002505314.
P. Nandi et al: Effect of Silica and Temperature on Spinel-Based High Alumina Castables: The American Society Bulletin, Dec. 2000, pp. 65-69, XP002505315.
Extended European Search Report dated Dec. 10, 2008.
Japanese Notice of Reasons for Rejection issued in Japanese Patent Application No. 2005-380989 dated Jul. 9, 2009.

* cited by examiner

*Primary Examiner* — Karl E Group
(74) *Attorney, Agent, or Firm* — Sughrue Mion, PLLC

(57) ABSTRACT

A refractory brick having durability equal to alumina-magnesia castable materials, which is especially suitable for a ladle for steel making is provided. A refractory brick prepared by using an alumina raw material and a magnesia raw material containing 90% by mass or more of a fine powder of not more than 0.5 mm, press molding and then heat treating at 100° C. or higher and not higher than 1,150° C., the refractory brick containing $Al_2O_3$ and $MgO$ in a total sum of 90% by mass or more, from 4 to 16% by mass of $MgO$, from 0.5 to 5% by mass of $SiO_2$, and $Na_2O$ and $K_2O$ in a total sum of from 0.3 to 2% by mass, with the remainder being inevitable impurities and $Al_2O_3$.

2 Claims, 2 Drawing Sheets

REFRACTORY BRICK

TECHNICAL FIELD

The present invention relates to a refractory which is used in various kilns to be exposed at a high temperature and in particular, to a refractory brick which is used in a ladle for steel making.

BACKGROUND ART

For a ladle for steel making, refractory bricks or castable materials which are a monolithic refractory have hitherto been used as a lining refractory. Under those backgrounds, in integrated iron mills in Japan, a method for forming a lining by casting a castable material on the spot of use is the main current.

As to the quality of castable materials, in recent years, alumina-magnesia materials composed mainly of alumina and magnesia are widely used. Alumina and magnesia are composed of a corundum crystal and a periclase crystal, respectively, and these react with each other at a high temperature during the use of a kiln such as ladles, thereby forming a spinel crystal while being accompanied with volume expansion. Following this change of crystal, a minute spinel-containing layer is formed in the vicinity of the working surface of a high temperature, and therefore, such an alumina-magnesia material has characteristic features that it is very small in infiltration of slag and excellent in resistance against slag corrosion. Moreover, such an alumina-magnesia material does not contain carbon, and therefore, especially in case of receiving or refining a low-carbon molten steel, it also has a characteristic feature that staining of the steel to be caused due to lining refractories can be eliminated.

However, in order to form a ladle lining refractory by casting, a number of machine equipment inclusive of a mixer for kneading a castable material with water on the spot of construction, a metallic frame for constructing a kneaded material in a prescribed thickness, a distributor for uniformly inputting a kneaded material in a frame and a vibrator for obtaining a constructed body having sufficiently uniform quality and high degree of packing should be prepared.

Furthermore, since the castable material after the construction contains water, drying equipment for heating and drying step-by-step is necessary. In the case where the rate of drying is too fast, since water vapor explosion is often generated by water in the constructed body, this drying equipment should have specifications such that the temperature can be satisfactorily controlled. The performance of the castable material as a refractory is ultimately determined by whether the construction on the spot and the drying state are good or bad.

On the other hand, in many electric furnace iron mills in Japan and almost all of iron mills in Europe and North America, bricks are used for a ladle lining material.

The reasons why the brick construction is performed instead of casting reside in the matter that special equipment or apparatus should be set up for the foregoing construction or drying; the matter that the construction on the spot which affects the performance of the lining material is uneasy; and the like.

As to the quality of bricks which are used for ladles, high-alumina or carbon-containing bricks are the main current, and alumina-spinel materials are used in part of iron mills.

Also, in Patent Document 1, unburned alumina-magnesia bricks using a resin as a binder for alumina and magnesia are proposed.

Furthermore, in Patent Document 2, unburned alumina-magnesia based bricks using a coarse magnesia raw material and a spinel raw material of not more than 1 mm are disclosed.

Patent Document 1: JP-A-63-151661
Patent Document 2: JP-A-2000-272956

DISCLOSURE OF THE INVENTION

Problems that the Invention is to Solve

High-alumina bricks are a general refractory brick which is widely used in various kilns including ladles. But, the high-alumina bricks are inferior in durability to carbon-containing bricks or alumina-spinel bricks.

Carbon-containing bricks are used in various kilns and also used in part of ladles. However, in particular, when used for lining of a ladle for handling a low carbon steel, there is a possibility that carbon in the brick stains the steel. Also, in kilns under an oxidative atmosphere, the carbon is oxidized and disappears.

Alumina-magnesia bricks are used in various kilns and also recently used in ladles.

The alumina-magnesia bricks are a burned brick which is manufactured by combining a synthesized spinel raw material and an alumina raw material and burned usually at thousand and several hundred centigrade (usually, about 1,500° C.). In case of this brick, though magnesia (MgO) which is a constitutional component of a spinel is contained in the brick, it is already contained as a spinel crystal in the brick, and therefore, periclase which is a crystal of magnesia does not exist.

Accordingly, a new spinel formation reaction is not generated even at a high temperature at which this brick is used. For that reason, the formation of a minute spinel-containing layer in the vicinity of the working surface following the spinel formation reaction during the use, an aspect of which is a characteristic feature of the alumina-magnesia material, is not generated.

In alumina-spinel bricks, due to the spinel-containing effect, nevertheless the slag corrosion resistance is satisfactory as compared with high-alumina bricks and the like, the infiltration of slag is large, and therefore, exfoliation damage is easily generated, the life of lining is instable, and it is difficult to realize a satisfactory long life.

As described previously, since alumina-magnesia castable materials composed mainly of alumina and magnesia have characteristic features of both excellent slag infiltration resistance and slag corrosion resistance, they are used as a ladle lining.

However, in order to achieve casting, as described previously, it is necessary to set up previously various equipment such as various construction apparatus for the construction on the spot and a drying apparatus of the constructed body for safe drying, and it is natural that not only costs for setting up the equipment (several tens million yen or more) are required, but the continuous maintenance of apparatus is necessary.

For that reason, it is the present state that there are a very few of iron mills wherein a lining is constructed of a casting material over the world and that an overwhelmingly number of iron mills employ a lining by brick laying which does not require a special construction apparatus or drying equipment.

However, alumina-magnesia refractory bricks which are equal or analogous to alumina-magnesia castable materials having excellent characteristic features have not been put to practical use.

Since the unburned alumina-magnesia brick proposed in Patent Document 1 uses a resin as a binder, the resin is carbonized by heating and remains the brick texture. Since this carbonized carbon remarkably impairs the reaction between alumina and magnesia, namely the spinel formation reaction, the formation of a minute spinel-containing layer due to the spinel formation and expansion reaction, which is an original characteristic feature of alumina-magnesia materials, is not substantially generated, and an effect for suppressing slag infiltration is not brought. For that reason, such has not been put to practical use.

Since the unburned alumina-magnesia based brick disclosed in Patent Document 2 uses a magnesia raw material in the coarse particle region, considering that the use amount is small, the expansion at the time of spinel formation is large, and the brick collapses during heating. Such has not been put to practical use.

As one of methods for manufacturing a brick by an alumina-magnesia material, there is a method in which precasting is previously performed in a prescribed shape in a manufacturing factory by using an alumina-magnesia castable material, thereby forming a block.

But, the molding efficiency is not comparable to the press molding, and the manufacturing costs are enormous. Therefore, such has not been put to practical use for molding of bricks other than special bricks such as large-sized blocks exceeding the scope of a usual brick or bricks having a very complicated shape so that press molding is hardly applicable, namely usual bricks.

In the light of the above, there has been nothing of practical technology which is satisfactory with both a technology of controlling the volume expansion for the purpose of forming a minute spinel-containing layer utilizing the volume expansion at the time of a spinel formation reaction occurred at a high temperature during the use, which is a characteristic feature of an alumina-magnesia castable material, and a technology capable of achieving press molding with a large amount without difficulty and holding basic characteristics as a brick, such as durability.

The invention is aimed to provide a refractory brick which does not require a special construction apparatus or drying equipment which is considered necessary in casting while having an excellent characteristic feature of the existing alumina-magnesia castable material, is able to be subjected to brick laying by the conventional method and is also able to be mass-produced by means of press molding.

Means for Solving the Problems

The invention is concerned with a refractory brick prepared by using an alumina raw material and a magnesia raw material containing 90% by mass or more of a fine powder of not more than 0.5 mm and containing a particle exceeding 90 μm, adding silica sand, a silica stone powder, an agalmatolite powder, silica flour or a refractory clay singly or in admixture, press molding and then heat treating at 100° C. or higher and not higher than 1,150° C., the refractory brick containing $Al_2O_3$ and MgO in a total sum of 90% by mass or more, from 4 to 16% by mass of MgO, from 0.5 to 5% by mass of $SiO_2$ and $Na_2O$ and $K_2O$ in a total sum of from 0.3 to 2% by mass, with the remainder being inevitable impurities and $Al_2O_3$ and having a free expansion coefficient at 1,500° C. of from 2 to 5% and an expansion coefficient under a load of 1 MPa of from −6 to 1%; and furthermore, the invention is concerned with a refractory brick, which is characterized by containing neither carbon nor an organic material in which carbon remains at 1,200° C. or higher and having a CaO content of less than 0.5% by mass. According to this, it becomes possible to realize an alumina-magnesia refractory brick which has not been achieved so far.

Furthermore, additive components such as a dispersant and a hardening adjusting agent, which are considered necessary in conventional castable materials, can be omitted, leading to accomplishment of a refractory brick having more excellent slag infiltration resistance and corrosion resistance than a castable material.

ADVANTAGES OF THE INVENTION

According to the invention, by forming a minute spinel-containing layer in the vicinity of the heating surface while positively utilizing the expansion properties following a spinel formation reaction to be generated at high temperatures during the use, slag infiltration resistance and slag corrosion resistance which are remarkably excellent as compared with conventional refractory bricks have been achieved. By simultaneously achieving overcoming problems in a technology for controlling expansion properties and its manufacture and ensuring the strength as a brick, it has become possible to achieve press molding with mass production; and in its turn, it has become possible to construct brick laying in a conventional manner without necessity of a special kneading apparatus, a distributor, drying equipment and the like, which are considered necessary in casting on the spot. Furthermore, since there is not generated a scatter on whether or not the construction on the spot is good, it has become possible to obtain a refractory constructed body with always stable performance. Even according to the results of actual use in a ladle, a life of 1.5 to 2 times has been achieved as compared with a conventional material.

BEST MODE FOR CARRYING OUT THE INVENTION

Figure 1:
FIG. 1 is a cut surface of Invention Example 2 after a corrosion test.

In an alumina-magnesia refractory, though the volume expansion following a spinel formation reaction varies with the magnesia content, it has a large value exceeding 2%. When this expansion appears in a state that the refractory is lined within a kiln such as a ladle as it is, a large stress following the expansion is generated, and the lined refractory is broken and collapses. Conversely, when the volume expansion following a spinel formation reaction is too small, a minute spinel-containing layer cannot be formed in the brick texture, and an effect for suppressing slag infiltration cannot be obtained. Accordingly, a technology capable of controlling this volume expansion is an essential requirement for putting an alumina-magnesia refractory to practical use.

In an alumina-magnesia castable material, a high alumina cement is naturally used as a binding material. It is considered that the high alumina cement in the alumina-magnesia castable material works as a binding material and also bears another important role.

The high alumina cement is composed of $Al_2O_3$ and CaO. It is found out that when a minimal amount of silica ($SiO_2$) is added to this, a volume expansion characteristic following a crystal change at the time of spinel formation to be generated at high temperatures during the use can be controlled due to a synergistic effect among $Al_2O_3$, CaO and $SiO_2$. In particular, in a restrained state, namely in a state that a load is applied to a constructed lining structure, its effect for suppressing expansion is effectively exhibited. By adjusting the contents of the high alumina cement and $SiO_2$, it is possible to adjust the expansion behavior under a load while having free expansion, to form a minute spinel-containing layer in the vicinity of the working surface which is considered to be finally necessary and to prevent breakage of a refractory-lined structure.

However, in press molding a brick, it is very difficult to use a cement such as a high alumina cement. That is, the content of water to be added which is considered necessary in a rammed earth for press molding a brick is from about 2 to 3% by mass and is extremely low as compared with water necessary for casting construction. Therefore, a small amount of water reacts with the cement within a short time; the rammed earth for molding becomes in a dried-out state; the press molding becomes difficult; and even when molded, a sufficient pack density cannot be obtained. Furthermore, the green body strength after molding is low, and handling is difficult.

On the basis of a thought that since there was no practical technology enabling one to easily achieve press molding in manufacturing a brick and simultaneously control a volume expansion characteristic at the time of a spinel formation reaction to be generated at high temperatures during the use, an alumina-magnesia brick which has gotten excellent results in castable materials cannot be put to practical use, the present inventors have accomplished the invention. Furthermore, since a dispersant, a hardening adjusting agent and the like which are considered necessary in castable materials can be omitted, they have accomplished a refractory brick having more excellent slag infiltration resistance and corrosion resistance than a castable material.

The refractory brick of the invention is essentially composed of an alumina raw material and a magnesia raw material, and a total sum of components dependent upon these raw materials, namely $Al_2O_3$ and MgO should be 90% by mass or more. When it is less than 90% by mass, it is hard to say that the resulting brick is a brick composed of alumina and magnesia, and a hot spinel formation reaction between alumina (corundum crystal) and magnesia (periclase crystal) which is an object of the invention and an expansion behavior following this become unclear. Therefore, it is impossible to devise to largely improve the slag infiltration resistance of a brick. The alumina raw material is the core of refractory materials of from a coarse particle region to a fine powder region.

For the purpose of generating a spinel formation reaction at a high temperature uniformly and efficiently in a brick, with respect to the particle size of the magnesia raw material to be used in the invention, the magnesia raw material should be used in a state of a fine powder containing 90% by mass or more of a fine powder of not more than 0.5 mm and containing a particle exceeding 90 μm.

The present inventors compared and studied expansion properties following a spinel formation reaction to be generated in a temperature region of 1,200° C. or higher by using a magnesia raw material having a varied particle size as well as the $SiO_2$ and $Na_2O$ or $K_2O$ components as a constitutional requirement of the invention.

As a result, it was noted that when a magnesium raw material having a middle or large particle size of, for example, about 1 mm is used, a spinel formation reaction is gradually generated, and a final absolute expansion amount becomes large with a lapse of time of the reaction. However, since the spinel formation reaction, namely expansion behavior proceeds too slowly, it is difficult to set up the $SiO_2$ amount and the $Na_2O$ amount or $K_2O$ amount which are the most suitable for controlling its expansion amount, and the necessary amounts of these $SiO_2$ and $Na_2O$ or $K_2O$ increase. Moreover, since the spinel formation is generated in the surroundings of the magnesia particle, and a spinel is not formed in a uniformly dispersed state in the texture, a minute spinel-containing layer in the vicinity of the working surface is hardly formed. Therefore, such was judged to be not preferable.

On the other hand, it has been concluded that the magnesia raw material is fine from the standpoints of expansion properties following the spinel formation and easiness of its control. That is, in a finely powdered magnesia raw material containing 40% by mass or more of particles of not more than 90 μm, not only a very secure expansion behavior appears, but the adjustment of expansion properties by $SiO_2$ and $Na_2O$ or $K_2O$ as the constitutional factor of the invention is easy. The amount of the particles of not more than 90 μm is preferably 65% or more. Also, when the magnesia raw material is one containing 90% by mass or more of a fine powder of not more than 0.3 mm, results were substantially the same as in the case of the magnesia raw material composed mainly of particles of not more than 90 μm.

However, in practical use, when a fine powder of not more than 0.5 mm is used, an expansion behavior at the time of spinel formation appears to an extent that it does not substantially differ from that in case of using a finer powder, and also, its control is possible. Furthermore, even when particles exceeding 0.5 mm coexist in an amount of less than 10% by mass, the spinel formation expansion appears without particular hindrance, and its adjustment is possible without large difficulty. Thus, it was judged that such is practically sufficient. But, when particles exceeding 0.5 mm are contained in an amount of 10% by mass or more, the problems as in the above-described case of using a magnesium raw material having a middle or large particle size are initiated to be caused. Accordingly, the magnesia raw material which can be used in the invention is a magnesia raw material containing 90% by mass or more of a fine powder of not more than 0.5 mm and containing a particle exceeding 90 μm as shown in the Examples.

The magnesia raw material is used for the purpose of generating a reaction with the alumina raw material, namely a spinel formation reaction in a temperature region of from 1,200 to 1,400° C., which is slightly lower than the temperature of the working surface when the brick of the invention is used, thereby forming a minute spinel-containing layer in the vicinity of the working surface at a high temperature and should be a magnesia raw material containing 90% by mass or more of a fine powder of not more than 0.5 mm and containing a particle exceeding 90 μm as described previously. Its use amount should be from 4 to 16% by mass in terms of an MgO component amount in the brick. When the use amount is less than 4% by mass, even when a spinel is formed upon the reaction with the alumina raw material, its formation absolute amount is insufficient, and the expansion amount following this spinel formation reaction is insufficient. Therefore, it is difficult to make the texture in the vicinity of the working surface minute sufficiently for the purpose of suppressing the slag infiltration. On the other hand, it is known that magnesia has large slag infiltration as an original nature (it is easily infiltrated by the slag). For that reason, when the MgO component amount exceeds 16% by mass, since easiness of the slag infiltration which is brought by an increase of the MgO component itself is promoted, the slag infiltration resistance is not enhanced.

The spinel formation reaction between alumina and magnesia is always generated in a certain temperature region, namely in a temperature region of 1,200° C. or higher so far as alumina and magnesia come into contact with each other in the brick texture. Also, a volume change following this reaction is a phenomenon which is always generated at the same time. Accordingly, when an expansion coefficient is measured in a state that the brick is not retrained at all but can freely change its dimension, large expansion is always exhibited following the spinel formation. The expansion coefficient is usually measured as a linear expansion coefficient, and in general, its value exceeds 2%.

Though an issue which is of a problem in putting the alumina-magnesia brick as a kiln lining material is concerned with the expansion characteristic, it is not the case that free expansion in this non-retrained state is a problem. Rather, since this free expansion is generated, a minute spinel-containing layer can be formed in the texture. Expansion in a restrained state, namely under a load in the state that a load is applied is important.

When the alumina-magnesia brick is heated in a state that it is lined within the kiln and reaches a temperature region where a spinel is formed, the brick tries to expand simultaneously with the spinel formation. However, since the brick is restrained by an iron skin, it receives a compression stress in proportion to the try to expand. At that time, the compression stress can be considered equal to the state that a load is applied to the brick.

If the expansion in a restrained state, namely under a load has an expansion amount close to the free expansion, a very large stress is naturally generated in the brick in a state that the brick is lined within the kiln, and the brick is broken and collapses. On the other hand, what the free expansion is large, and the expansion in a state that a load is applied is small, namely a change of the whole volume is small means that the expansion is absorbed by pores in a micro texture or the like. That is, this means that a proportion of the volume change by expansion is absorbed in the brick texture without causing collapse of the brick and is nothing more than the matter that the texture is made minute.

A characteristic feature of the alumina-magnesia brick of the invention resides in the matter that by controlling the free expansion characteristic and the expansion characteristic under a load, a minute spinel-containing layer is formed in the vicinity of the working surface of the brick, thereby largely enhancing the slag infiltration resistance.

The refractory brick of the invention should contain from 0.5 to 5% by mass of $SiO_2$ and from 0.3 to 2% by mass of $(Na_2O+K_2O)$.

$SiO_2$ is used for the purpose of absorbing the expansion following the spinel formation reaction, and even when it exists singly, the expansion cannot be sufficiently absorbed. While the matter that $SiO_2$ forms a glass phase at a high temperature is utilized, in the $Al_2O_3$ and MgO components, a glass phase composed mainly of $SiO_2$ is very slightly vitrified in a temperature region of from 1,200 to 1,400° C. at which a spinel is formed. Therefore, the amount necessary for absorbing the expansion, namely the amount of a glass phase sufficient such that the particles work each other for the purpose of absorbing a stress following the expansion is not obtained yet. Though a more glass phase is generated at a higher temperature, it is no longer possible to bear a role to absorb the expansion following the spinel formation.

In order to absorb large expansion following the spinel formation reaction, an adequate glass phase should exist in the texture in a temperature region in which a spinel is just formed and enable particles to move as a role as a lubricant in some sense.

When the $SiO_2$ component coexists with $Na_2O$ or $K_2O$ as an alkaline component, a glass phase is formed in a temperature region where a spinel is formed upon a reaction of alumina and magnesia, thereby obtaining a work to absorb the large expansion following the spinel formation reaction. As is well known, when $SiO_2$ and the alkali metal such as $Na_2O$ and $K_2O$ coexist, a glass phase is formed at a temperature beginning from a low temperature of about 850° C. This is a temperature which is sufficiently lower than the spinel formation reaction temperature, and thereafter, the amount of the glass phase increases with an increase of the temperature.

In the conventionally general thought of refractories, what a refractory contains these low-melting components is considered non-preferable because the refractoriness or corrosion resistance is lowered. Certainly, it is correct that when the amount of such components is too high, a reduction of the corrosion resistance or the like is caused. However, according to the invention, in a refractory in which $Al_2O_3$ and MgO are constituted as major components in a specified proportion, by using these low-melting components for forming a glass phase in a specified amount, a refractory brick which gives an action to absorb the expansion, an aspect of which was difficult so far, does not cause breakage of the brick without reducing the corrosion resistance and has largely enhanced slag infiltration resistance has been successfully obtained.

$SiO_2$ is a component constituting a major component of the glass phase, and its content is from 0.5 to 5% by mass. When the content of $SiO_2$ is less than 0.5% by mass, the absolute amount of the glass phase is insufficient so that the transfer of particles at the time of spinel formation cannot be promoted and that the expansion cannot be absorbed. It is more preferable that $SiO_2$ is contained in an amount of 0.8% by mass or more. When the content of $SiO_2$ is not more than 5% by mass, a sufficient amount of the glass phase is already obtained. Therefore, even in large expansion in the case where the MgO content is high, the transfer of particles at the time of spinel formation is easy, and the expansion can be absorbed. Accordingly, the $SiO_2$ component exceeding 5% by mass is unnecessary, and the amount of the glass phase becomes excessive, leading to an advance toward the direction of a reduction of the corrosion resistance. Therefore, such is not preferable.

This necessary content range of $SiO_2$ is a range necessary for absorbing the expansion at the time of spinel formation in an alumina-magnesia brick using an alumina raw material and a magnesia raw material containing 90% by mass or more of a fine powder of not more than 0.5 mm and containing a particle exceeding 90 μm and having a total sum of $Al_2O_3$ and MgO of 90% by mass or more and an MgO content of from 4 to 16% by mass.

The alkali metal oxide such as $Na_2O$ and $K_2O$ is known as a glass modifying ion and is used in a glass composed mainly of $SiO_2$. In mixing in a glass composed of $SiO_2$ singly, such an alkali oxide decreases its melting point and works to decrease the viscosity at the same temperature. It is important that such a component exists simultaneously with $SiO_2$.

The total sum of $Na_2O$ and $K_2O$ which are considered necessary in the invention should be adjusted by the total amount of $Al_2O_3$ and MgO, namely the amount of the major components, the content of the MgO component, the content of the $SiO_2$ component and the like. In the case where the total sum of $Al_2O_3$ and MgO is 90% by mass, the MgO content is from 4 to 16% by mass, and the content of $SiO_2$ is from 0.5 to 5% by mass, when the total sum of $Na_2O$ and $K_2O$ is at least in the range from 0.3 to 2% by mass, it is possible to assist the transfer of particles, to absorb the expansion due to the spinel formation and to form a minute spinel-containing layer in the vicinity of the working surface in a temperature region where a glass phase of an adequate viscosity is formed together with $SiO_2$, and a spinel is formed.

When the total sum of $Na_2O$ and $K_2O$ is less than 0.3% by mass, it is difficult to sufficiently form a glass phase composed mainly of $SiO_2$ in a spinel forming temperature region as described previously. On the other hand, even when $Na_2O$ and $K_2O$ are contained in an amount exceeding 2% by mass, the hot viscosity of the glass phase merely decreases, and no effect is brought. Also, the corrosion resistance tends to decrease similar to the case of $SiO_2$. Thus, such is not preferable.

In such a manner, when either one or both of $Na_2O$ and $K_2O$ exist simultaneously with $SiO_2$, in the refractory brick of the invention, the expansion at the time of spinel formation is absorbed as described above. This makes it possible to form a minute spinel-containing layer in the vicinity of the working surface, thereby giving excellent slag infiltration resistance.

The alumina raw material and the magnesia raw material which are the major raw materials of the refractory brick of the invention include raw materials of various grades and contain suitable impurity components. As a matter of course, it is preferable that the refractory brick of the invention does not contain impurity components other than $Al_2O_3$, MgO, $SiO_2$, $Na_2O$ and $K_2O$. Practically, it is necessary to take into account appropriateness of costs, and it is inevitable that impurity components are contained to some extent.

As described previously, in the refractory brick of the invention, at least the total sum of $Al_2O_3$ and MgO should be 90% by mass or more, and the remainder other than MgO, $SiO_2$, $Na_2O$ and $K_2O$ is composed of $Al_2O_3$ and impurities. In order to exhibit the corrosion resistance which alumina and magnesia originally possess, the content of the impurities is preferably not more than 6% by mass, if possible. Furthermore, in order to surely perform the control of the expansion characteristic of the refractory brick of the invention, the content of the impurities is more preferably not more than 5% by mass.

In the case where a fused alumina raw material or the like is used, in order to exhibit its high corrosion resistance, it is desirable that the content of impurity components is not more than 4% by mass. Since the refractory brick of the invention is heated at a low temperature, there is a possibility that the brick contains a so-called loss on ignition such as water of crystallization, and this loss on ignition is considered as an impurity.

The refractory brick of the invention is formed into a press moldable rammed earth having from about 2 to 3% by mass of water in a usual method and press molded. For a press apparatus for molding, a usually used hydraulic press or friction press is used.

In the refractory brick of the invention, the heating temperature after press molding, especially its upper limit is important.

In general, in the brick manufacture, heating at a temperature of 1,000° C. or higher, which is called calcination is often carried out. On the other hand, there is a brick which is only subjected to a low-temperature heating treatment at not higher than several hundred centigrade, which is called an unburned brick.

The calcination is carried out for the purpose of obtaining strength by sintering particles each other, or in a sense of enhancing stability of the brick by previously heating at a temperature close to the temperature at which the brick is used. On the other hand, the unburned brick is one in which a resin gives a sufficient strength as a binder at normal temperature, and the resin is carbonized upon heating to obtain a carbon bond, as represented by, for example, a carbon-containing brick and is employed in the case where the brick characteristic can be thoroughly maintained even without being previously heat treated in a manufacturing factory.

In the refractory brick of the invention, during a period of from lining of the brick on a kiln up to receipt of heating in the use, $Al_2O_3$ derived from the alumina raw material and MgO derived from the magnesia raw material in the brick should exist as they are without causing a reaction. That is, the spinel formation reaction should be generated in a kiln in which the brick is used. If not, the situation that the volume expansion following the spinel formation reaction is generated in a restrained state cannot be obtained, and minuteness to be caused due to the absorption of expansion in the brick cannot be obtained. Accordingly, since the spinel formation reaction is generated centering on a temperature of from about 1,200 to 1,400° C. as described previously, the refractory brick of the invention should not be heat treated at a temperature of 1,200° C. or higher.

The heating temperature of the refractory brick of the invention should be never 1,200° C. or higher. Taking into account an error of the heating temperature and the heating time, the heating temperature is suitably not higher than 1,150° C. The heating temperature is preferably not higher than 1,100° C., and most preferably not higher than 1,050° C.

On the other hand, in order to completely dry water which is at least necessary for press molding, the brick of the invention should be heated at a temperature of 100° C. or higher. In order to more surely perform drying, the heating temperature is preferably 110° C. or higher. When it is 150° C. or higher, free water does not substantially remain.

Also, an optimal heating temperature varies depending upon what kind is used as a binder in the refractory brick of the invention. For example, in the case where a silicate containing $SiO_2$ and $Na_2O$ or $K_2O$ as essential elements of the invention is used as the binder, when this silicate is dissolved in water, after press molding, a sufficient green body strength is brought by drying at 100° C. or higher, and the product can be formed as a brick as it is. On the other hand, in the case where the silicate is sparingly soluble and is not substantially dissolved in water, a sufficient strength cannot be obtained by heating at a low temperature, and therefore, it would be better that heating is performed at a temperature of from about 650 to 1,000° C. Also, in the case where an organic material-containing binder is used, the binder includes one which is able to obtain the strength by merely removing water and one which is unable to obtain a sufficient strength unless the temperature is raised to, for example, 200 to 300° C.

In the refractory brick of the invention, carbon which remains even at a high temperature of 1,200° C. or higher should not be contained in the brick texture. When carbon is contained in the brick texture, an opportunity of direct contact between the alumina raw material particle and the magnesia raw material particle is deprived, a spinel by the reaction between $Al_2O_3$ and MgO is hardly formed. When a spinel is not formed, the expansion is not generated, and the characteristic feature of the refractory brick of the invention that the formation of a minute spinel-containing layer in the vicinity of the working surface is obtainable by controlling it is not obtained.

Even when carbon is contained in the brick texture, direct contact between the alumina raw material particles and the magnesia raw material particle is partially obtained, and therefore, a spinel is also formed a little. However, it cannot be said that the spinel formation reaction is surely generated, and it is difficult to surely realize the characteristic feature of the refractory brick of the invention which is obtainable by controlling the volume expansion following this spinel formation.

Accordingly, the refractory brick of the invention should not contain not only carbon but organic materials having a nature such that even when heated at 1,200° C., carbon remains, for example, organic high-molecular compounds having a number of benzene rings, such as pitch, and phenol resins.

As a primary binder at the time of press molding, it is possible to use a small amount of an organic thickener or adhesive or the like. There is no problem so far as it is burnt off at a temperature at which the spinel starts to be formed, namely when the refractory brick of the invention is heated to reach 1,200° C.

The CaO component is also contained as an impurity component in the magnesia raw material, and therefore, it is difficult that the CaO component is not contained at all. However, the content of the CaO component is low as far as possible. When the content of the CaO component is high, there is a possibility that the state of a rammed earth for press molding the brick is changed within a short period of time. Thus, not only the manufacture of a brick having stable pack density and strength is difficult, but in a temperature region at which a spinel is formed, a glass phase to be formed by $SiO_2$ and $Na_2O$ or $K_2O$ as essential components of the invention is influenced, whereby the absolute amount of the glass is changed, or the viscosity is changed. Therefore, such is not preferable.

A tolerable content of CaO in the refractory brick of the invention is 0.5% by mass. What the content CaO exceeds this is not preferable because the foregoing influences against the rammed earth of press molding and the glass phase are large, whereby the characteristic feature of the refractory brick of the invention cannot be exhibited.

As described previously, the refractory brick of the invention is a refractory brick prepared by using an alumina raw material and a magnesia raw material containing 90% by mass or more of a fine powder of not more than 0.5 mm and containing a particle exceeding 90 μm, adding silica sand, a silica stone powder, an agalmatolite powder, silica flour or a refractory clay singly or in admixture, press molding and then heat treating at 100° C. or higher and not higher than 1,150° C., the refractory brick containing $Al_2O_3$ and MgO in a total sum of 90% by mass or more, from 4 to 16% by mass of MgO, from 0.5 to 5% by mass of $SiO_2$ and $Na_2O$ and $K_2O$ in a total sum of from 0.3 to 2% by mass, with the remainder being inevitable impurities and $Al_2O_3$. and furthermore, a refractory brick, which is characterized by containing neither carbon nor an organic material in which carbon remains at 1,200° C. or higher and having a CaO content of less than 0.5% by mass. These limitations are naturally made while considering, as an important requirement, the matter that the expansion following the spinel formation reaction to be generated at about 1,200° C., namely the free expansion amount and the expansion amount under a load can be controlled.

Accordingly, so far as usually used refractory raw materials are used, desirable free expansion and expansion under a load are obtainable. However, for example, in the case where a very special impurity component, for example, low-melting metal components, is contained, there is a possibility that the hot nature does not exhibit an original behavior of a refractory brick composed mainly of alumina and magnesia.

In the refractory brick of the invention, a desirable hot expansion characteristic is that a free expansion coefficient at 1,500° C. is from 2 to 5% and that when a load of 1 MPa is applied, an expansion coefficient under a load at 1,500° C. does not exceed 1%.

What the free expansion to be caused due to the spinel formation reaction is too small is not preferable because the minuteness due to restraint is not sufficient; and what it is too large is not preferable because there may be the case where the control of the expansion under a load is difficult. Its optimal range is from 2 to 5%.

The measurement of the free expansion follows a method specified in JIS R2207. When the heating rate is too fast, the spinel formation reaction does not catch up, thereby possibly exhibiting small expansion. Therefore, a care must be taken. That is, though the spinel formation reaction is generated at from 1,200° C. to 1,400° C., a progress speed of the reaction is actually affected by the particle size of the magnesia raw material and the contact state with the alumina raw material. Therefore, in general, there is a tendency that the expansion is detected somewhat delayed. Accordingly, in order that the temperature rise rate may not be too fast, it was judged to be the most appropriate that the measurement maximum temperature is appropriately 1,500° C. at which the reaction is considered substantially complete and that a value is evaluated when heating is carried out at a temperature rise rate of 4° C./min, and the temperature reaches 1,500° C. The foregoing optimal range of from 2 to 5% is a value when heating is carried out at a temperature rise rate of 4° C./min, and the temperature reaches 1,500° C.

The expansion under a load of the refractory brick of the invention is an important characteristic in specifying a degree on how the expansion following the spinel formation reaction can be absorbed in a lined state on the kiln. It is necessary that when a load of 1 MPa is applied, the expansion coefficient under a load at 1,500° C. does not exceed 1%. When the expansion coefficient under a load exceeds 1%, there is caused a possibility that the brick is cracked and further broken, resulting in collapse. The expansion coefficient under a load is more preferably not more than 0.5%, and its most optimal range is from 0 to −3%.

What the value of the expansion coefficient under a load is on a minus side means that when heating is performed under a load of 1 MPa, setting is already generated (contracted from the original dimension) at the time of reaching 1,500° C. Actually, deformation is caused due to expansion of the brick and a stress by a load, and it is not the case where the load of 1 MPa is always applied. Therefore, setting is not generated in actual kilns. In the refractory brick of the invention, it is interpreted that one exhibiting "minus" is easily deformed.

In that sense, as to the expansion characteristic, there is no problem even when the value of the expansion coefficient under a load at 1,500° C. is minus. However, in the case that an extremely minus value is exhibited, there is a tendency that abrasion is easily generated due to flowing of the contents in the kiln or the like. Therefore, in general, it would be better that the expansion coefficient under a load does not exceed −6%.

With respect to the expansion characteristic under a load in the invention, an expansion amount when the temperature is raised at a temperature rise rate of 5° C./min and reaches 1,500° C. in a method of applying a pressure of 1 MPa from the start of test according to "Testing method for compressive creep of refractory brick" as specified in JIS R2658 is measured.

JIS R2658 is originally concerned with a method for measuring a so-called creep amount in which a dimension changing from a point of time of reaching a certain temperature while keeping its temperature within a prescribed time is detected. In the refractory brick of the invention, it is important to grasp how extent the brick can be deformed due to a stress (load) by its own expansion. Since a load exceeding the stress due to the expansion by its own expansion is not substantially applied, the creep deformation after that does not have large meanings.

The alumina raw material to be used in the refractory brick of the invention is a raw material composed mainly of alumina and containing $Al_2O_3$ capable of forming a spinel upon reacting with magnesia. In addition to refractory raw materials which are usually used for refractories, for example, sintered alumina, white fused alumina, brown fused alumina, alumina shale (Chinese bauxite), bauxite and calcined alumina, alumina raw materials composed mainly of alumina and accompanied with other components, for example, one partially containing a spinel as a solid solution can also be used.

With respect to the magnesia raw material, in addition to fused magnesia and sea water magnesia clinker, a natural magnesia clinker obtained by dead burning natural magnesite can be used.

The binder includes various kinds, and though it is not the case that all of them have been studied, the binder is not particularly limited basically. However, as described previously, organic binders in which even when heated at a high temperature of 1,200° C. or higher, carbon remains, for example, pitch and phenol resins cannot be used. As an organic binder, materials which are burnt off at a temperature of not higher than 1,200° C. and in which carbon does not remain at 1,200° C. or higher, for example, molasses, pulp wastes, dextrin, methyl celluloses and polyvinyl alcohol can be used.

As an inorganic binder, materials containing $Al_2O_3$, $MgO$, $SiO_2$, $Na_2O$ and $K_2O$ components as constitutional elements of the invention, for example, bittern ($MgCl_2$), alkali metal silicates such as sodium silicate and potassium silicate, and sodium aluminate can be used by adjusting the addition amount thereof such that the respective components fall within the scope of the invention. These are preferable because they do not increase other impurity components. However, in a binder having a coagulation action such as sodium alumina, a care must be taken in the use for the purpose of obtaining an adequate rammed earth for press molding.

Of these inorganic binders, alkali metal silicates such as sodium silicate and potassium silicate are the most suitable. Materials having a varied ratio of $SiO_2$ to $Na_2O$ or $K_2O$ are commercially available, and when the contents of $SiO_2$ and $Na_2O$ or $K_2O$ as impurity components of the alumina raw material and the magnesia raw material to be used in the refractory brick of the invention are known in advance, it is possible to devise to more surely absorb the expansion by using a silicate having an optimal ratio. Also, such a silicate has a high strength after heating and is convenient. The alkali metal silicate is known as water glass and includes some kinds such as a liquid which is accompanied with water at normal temperature, a powder and a glass powder which is not substantially soluble in water. Even by using any of them, a rammed earth having excellent press moldability is obtainable.

Colloidal silica is also suitable as the binder of the refractory brick of the invention. Colloidal silica is a liquid composed of a silica sol and contains silica and an extremely small amount of alkalis. In the invention, colloidal silica is easy to adjust the $SiO_2$ amount and the ($Na_2O+K_2O$) amount and is excellent in a binding force after heating. Also, there is an organic-inorganic compound, for example, aluminum lactate, and such a compound can also be used. Even when a compound is not used, it is possible to mix and use an inorganic binder and an organic binder, thereby compensating the respective defects.

In the refractory brick of the invention, besides the major components of $Al_2O_3$ ad $MgO$, the content of $SiO_2$ is larger than the total sum of $Na_2O$ and $K_2O$. Therefore, for example, when the foregoing sodium silicate or potassium silicate is used as the binder, and the $Na_2O$ and $K_2O$ components are adjusted, the $SiO_2$ component is short. It is naturally necessary to adjust the $SiO_2$ content. For achieving this, silica sand or silica stone, an agalmatolite powder, silica flour or a refractory clay is added.

With respect to the manufacture method of the refractory brick of the invention, the blended raw materials are mixed and kneaded comprehensively or dividedly by a mixer or a kneader. In general, for kneading which is a pre-treatment process of press molding a brick, examples of a vessel-fixing type include a roller type SWP or Simpson mixer, a blade type high-speed mixer, a pressure type high-speed mixer or Henschel mixer and a kneader called a pressure kneader; and examples of a vessel-drive type include kneaders such as a roller type MKP and wet pan, a corner mixer, a blade type Eirich mixer and a vortex mixer. Also, there may be the case where such a kneader or mixer is equipped with a pressure or vacuum temperature-controlling apparatus (heating or cooling or thermal insulation), etc. The mixing or kneading time varies depending upon the kind and blending amount of raw materials, the kind of binder, the temperature (room temperature; raw material and binder) and the kind and size of the mixer or kneader and is from several minutes to several hours.

The kneaded material can be molded by a vibration press or a molding machine called CIP in addition to a friction press which is an impact press, a screw press or a hydro-screw press, a hydrostatic press or a hydraulic press, a toggle press and the like. There may be the case where such a molding machine is equipped with a vacuum deaeration apparatus or a temperature-controlling apparatus (heating or cooling or thermal insulation), etc. The molding pressure and the tightening number by a press molding machine vary depending upon the kind and blending amount of raw materials, the kind of binder, the temperature (room temperature; raw material and binder) and the kind and size of the molding machine. Molding is usually carried out at a molding pressure of from 0.2 t to 3.0 t and a tightening number of from one time to several ten times.

The refractory brick of the invention should not be heated at a temperature exceeding 1,150° C. In case of heating at not higher than about 500° C., a hot-blast circulation type dry heating furnace can be used; and in the case where heating of a higher temperature is necessary, a batch type single kiln such as en electric heating type, a gas heating type and an oil heating type and a continuous tunnel kiln such as a shuttle kiln and a carbell kiln are optimal. As a matter of course, any type of heating furnace can be used so far as it is able to thoroughly control the temperature and perform uniform heating.

EXAMPLES

With respect to the refractory bricks of the Invention and Comparative Examples, essential points of tests to be carried out and results thereof were summarized and described in Table 1, Table 2, Table 3, Table 4, Table 5 and Table 6.

TABLE 1

|  | Invention Example | | | | |
|---|---|---|---|---|---|
|  | 1 | 2 | 3 | 4 | 5 |
| Major raw material: | | | | | |
| Fused alumina | 93 | 88 | 80 | 80 | 78 |
| Sintered alumina | — | — | — | — | — |
| Calcined alumina | — | — | — | 8 | 8 |
| Brown fuse alumina | — | — | — | — | — |
| Alumina shale | — | — | — | — | — |
| Fused magnesia | — | — | — | — | — |
| Sea water magnesia linker | 5 | 7 | 14 | 7 | 7 |
| Binder: | | | | | |
| Sodium silicate | 1 | 3 | 3 | 3 | — |
| Potassium silicate | — | — | — | — | — |
| Sparingly soluble sodium silicate glass | — | — | — | — | 4 |
| Methyl cellulose | — | — | — | — | 0.03* |
| Aluminum phosphate | — | — | — | — | — |
| Phenol resin | — | — | — | — | — |
| High-alumina cement | — | — | — | — | — |
| Others: | | | | | |
| Refractory clay | 1 | 2 | 3 | — | 3 |
| Silica flour | — | — | — | 2 | — |
| Particle size distribution of magnesia raw material: | | | | | |
| Not more than 0.5 mm (% by mass) | 100 | 100 | 100 | 91 | 98 |
| Not more than 90 μm (% by mass) | 78 | 78 | 78 | 46 | 68 |
| Chemical components (% by mass): | | | | | |
| $Al_2O_3$ + MgO | 97.7 | 94.9 | 93.6 | 94.1 | 93.1 |
| MgO | 4.8 | 6.9 | 13.5 | 6.8 | 6.8 |
| $SiO_2$ | 0.9 | 2.2 | 2.8 | 3.7 | 4.4 |
| $Na_2O$ + $K_2O$ | 0.4 | 1.0 | 0.9 | 1.7 | 1.6 |
| CaO | <0.1 | 0.1 | 0.2 | 0.2 | 0.2 |
| C | — | — | — | — | <0.1 |
| Impurities | 1.0 | 1.8 | 2.5 | 0.3 | 0.7 |
| Heating temperature (° C.) | 200 | 200 | 200 | 125 | 1000 |

*Outer addition amount

TABLE 2

|  | Invention Example | | | | |
|---|---|---|---|---|---|
|  | 6 | 7 | 8 | 9 | 10 |
| Major raw material: | | | | | |
| Fused alumina | 43 | — | 10 | — | — |
| Sintered alumina | — | 40 | — | 27 | — |
| Calcined alumina | — | 7 | 10 | 10 | 8 |
| Brown fuse alumina | 40 | 40 | 57 | 30 | 48 |
| Alumina shale | — | — | — | 25 | 30 |
| Fused magnesia | — | 4 | — | — | — |
| Sea water magnesia clinker | 10 | 4 | 16 | 12 | 10 |
| Binder: | | | | | |
| Sodium silicate | 2 | 1 | 3 | 2 | 2 |
| Potassium silicate | 1 | 3 | 1 | — | — |
| Sparingly soluble sodium silicate glass | — | — | — | 1.5 | — |
| Methyl cellulose | — | — | — | — | 0.03* |
| Aluminum phosphate | — | — | — | — | — |
| Phenol resin | — | — | — | — | — |
| High-alumina cement | — | — | — | — | — |
| Others: | | | | | |
| Refractory clay | 2 | 4 | 3 | 2.5 | 2 |
| Silica flour | 2 | — | — | — | — |
| Particle size distribution of magnesia raw material: | | | | | |
| Not more than 0.5 mm (% by mass) | 100 | 100 | 100 | 98 | 98 |
| Not more than 90 μm (% by mass) | 78 | 78 | 78 | 68 | 68 |
| Chemical components (% by mass): | | | | | |
| $Al_2O_3$ + MgO | 91.3 | 91.1 | 90.9 | 90.1 | 90.8 |
| MgO | 9.8 | 8.0 | 15.6 | 11.7 | 9.8 |
| $SiO_2$ | 4.8 | 3.5 | 4.2 | 4.5 | 4.1 |
| $Na_2O$ + $K_2O$ | 1.3 | 0.6 | 1.8 | 1.3 | 1.2 |
| CaO | 0.3 | 0.2 | 0.4 | 0.3 | 0.3 |
| C | — | — | — | — | <0.1 |
| Impurities | 2.3 | 4.6 | 2.7 | 3.8 | 3.6 |
| Heating temperature (° C.) | 350 | 350 | 350 | 750 | 350 |

*Outer addition amount

TABLE 3

|  | Comparative Example | | | | | |
|---|---|---|---|---|---|---|
|  | 1 | 2 | 3 | 4 | 5 | 6 |
| Major raw material: | | | | | | |
| Fused alumina | 88 | 88 | 88 | 93 | 88 | 88 |
| Sintered alumina | — | — | — | — | — | — |
| Calcined alumina | — | — | — | — | — | — |
| Brown fuse alumina | — | — | — | — | — | — |
| Alumina shale | — | — | — | — | — | — |
| Fused magnesia | — | — | — | — | — | — |
| Sea water magnesia clinker | 7 | 7 | 7 | 5 | 7 | 7 |
| Binder: | | | | | | |
| Sodium silicate | — | — | 3 | — | — | 4 |
| Potassium silicate | — | — | — | — | — | — |
| Sparingly soluble sodium silicate glass | — | — | — | — | — | — |
| Methyl cellulose | — | — | — | — | — | — |
| Aluminum phosphate | — | — | — | 2 | — | — |
| Phenol resin | — | 2.5 | — | — | — | — |
| High-alumina cement | — | — | — | — | 5 | — |
| Others: | | | | | | |
| Refractory clay | 5 | 2.5 | 2 | — | — | 3 |
| Silica flour | — | — | — | — | — | 2 |
| Particle size distribution of magnesia raw material: | | | | | | |
| Not more than 0.5 mm (% by mass) | 100 | 100 | 0 | 65 | 100 | 100 |
| Not more than 90 μm (% by mass) | 78 | 78 | 0 | 8 | 78 | 78 |
| Chemical components (% by mass): | | | | | | |
| $Al_2O_3$ + MgO | 95.7 | 94.9 | 94.8 | 97.7 | 97.8 | 91.1 |
| MgO | 6.8 | 6.8 | 6.8 | 4.9 | 6.8 | 6.8 |
| $SiO_2$ | 2.8 | 1.5 | 2.1 | 0.2 | 0.3 | 5.7 |
| $Na_2O$ + $K_2O$ | 0.3 | 0.2 | 0.6 | 0.2 | 0.2 | 2.2 |
| CaO | 0.2 | 0.2 | 0.2 | 0.1 | 1.4 | 0.2 |
| C | — | 1.7 | — | — | — | — |
| Impurities | 1.0 | 1.4 | 2.3 | 2.5 | 0.3 | 0.8 |
| Heating temperature (° C.) | 1450 | 200 | 200 | 200 | 200 | 200 |

TABLE 4

| | Invention Example | | | | |
|---|---|---|---|---|---|
| | 1 | 2 | 3 | 4 | 5 |
| Moldability | Good | Good | Good | Good | Good |
| Strength of green brick briquette | Good | Good | Good | Good | Good |
| Compression strength after heating (MPa) | 53.4 | 62.0 | 66.3 | 57.8 | 58.5 |
| Free expansion coefficient at 1,500° C. (%) | 2.2 | 2.8 | 3.9 | 2.9 | 2.7 |

TABLE 4-continued

| | Invention Example | | | | |
|---|---|---|---|---|---|
| | 1 | 2 | 3 | 4 | 5 |
| Expansion coefficient under a load at 1,500° C. (%) | +0.5 | −0.8 | −0.3 | −1.4 | −2.1 |
| After corrosion test: | | | | | |
| Slag infiltration depth (mm) | Not infiltrated | Not infiltrated | Not infiltrated | Not infiltrated | Not infiltrated |
| Corrosion depth (mm) | 8.7 | 7.9 | 6.6 | 8.0 | 8.1 |

TABLE 5

| | Invention Example | | | | |
|---|---|---|---|---|---|
| | 6 | 7 | 8 | 9 | 10 |
| Moldability | Good | Good | Good | Good | Good |
| Strength of green brick briquette | Good | Good | Good | Good | Good |
| Compression strength after heating (MPa) | 73.1 | 84.5 | 76.9 | 52.6 | 60.4 |
| Free expansion coefficient at 1,500° C. (%) | 3.4 | 3.2 | 4.7 | 3.6 | 3.3 |

TABLE 5-continued

| | Invention Example | | | | |
|---|---|---|---|---|---|
| | 6 | 7 | 8 | 9 | 10 |
| Expansion coefficient under a load at 1,500° C. (%) | −2.5 | −1.9 | −1.8 | −3.8 | −2.9 |
| After corrosion test: | | | | | |
| Slag infiltration depth (mm) | Not infiltrated | Not infiltrated | Not infiltrated | Not infiltrated | Not infiltrated |
| Corrosion depth (mm) | 8.0 | 8.3 | 8.2 | 8.8 | 9.1 |

TABLE 6

| | Comparative Example | | | | | |
|---|---|---|---|---|---|---|
| | 1 | 2 | 3 | 4 | 5 | 6 |
| Moldability | Good | No problem | No problem | Attached onto the surface | Poor Difficult for molding | Good |
| Strength of green brick briquette | Slightly brittle | Good | Slightly brittle | Slightly brittle | Difficult for handling | Good |
| Compression strength after heating (MPa) | 38.5 | 40.7 | 36.3 | 21.4 | 14.8 | 68.6 |
| Free expansion coefficient at 1,500° C. (%) | 1.4 | 1.6 | 5.6 | 2.5 | 2.9 | 2.4 |
| Expansion coefficient under a load at 1,500° C. (%) | +1.3 | +1.41 | +3.3 | +2.4 | +2.7 | −4.7 |
| After corrosion test: | | | | | | |
| Slag infiltration depth (mm) | 9.8 | 3.5 | 4.9 | Impossible for evaluation | Impossible for test | Not infiltrated |
| Corrosion depth (mm) | 20.1 | 13.5 | 17.2 | | | 14.2 |

A blend was prepared by combining various alumina raw material, magnesia raw material, binder and adjustment additives; water was properly added so as to form a rammed earth suitable for press molding; and after kneading, the kneaded material was molded under a molding pressure of 1 ton/cm² by using a friction press. However, in case of using a liquid binder in kneading, water was not added, if not necessary. Also, in a blended material using a phenol resin as the binder, water is not added. A molded green brick briquette was heated for 24 hours in a hot blast circulation type heating furnace in the case where the prescribed temperature was not higher than 500° C. and for 5 hours in an electric furnace in the case where it was 500° C. or higher, respectively, thereby forming a brick.

With respect to the respective Invention Examples and Comparative Examples, the particle size of the magnesia raw material along with the raw material constitution and the chemical components and heating temperature of each brick were described in Tables 1 to 3. Also, with respect to the respective Invention Examples and Comparative Examples, the easiness of molding in press molding of the rammed earth in terms of moldability, the easiness of generation briquette defect or collapse of the green brick briquette after molding in terms of strength of green brick briquette, the compression strength after heating, the free expansion coefficient at 1,500° C., the expansion coefficient under a load at 1,500° C., and the results of corrosion test in terms of slag infiltration depth and corrosion depth were described in Tables 4 to 6.

With respect to the moldability, whether or not the materials can be packed and compressed in press molding; whether or not a defect such as cracks is generated in the briquette part at the time of removal from a molding frame; whether or not a part of the rammed earth attaches onto the liner surface at the time of removal from a molding frame; and whether or not lamination is generated were compared and evaluated. The case where the brick did not cause a problem in any of the items and was in a normal state was designated as "good"; and the case where the brick caused a slight fault in one of the items but did not cause a problem was designated as "no problem". In the case where a defect which is considered problematic in molding of a large quantity was observed in one or more of the items, its state was described.

With respect to the strength of the green brick briquette, by evaluating whether or not the strength was revealed to an extent that no problem is caused in handling after removal from a molding frame, the case where handling was possible without any problem was designated as "good"; and the case where the strength was slightly insufficient, but handling was possible by taking a care was designated as "slightly brittle". The case where usual handling was difficult was designated as "difficult for handling".

The results obtained by heating each of the bricks at a temperature shown in Tables 1 to 3 and after heating, measuring its compression strength were described in Tables 4 to 6. Also, the results obtained by cutting out each of the bricks after heating by a dry cutter to prepare a sample for measuring a hot expansion coefficient and measuring its free expansion coefficient at 500° C. under the above-described condition according to JIS R2207 were described in Tables 4 to 6. Similarly, the results obtained by preparing a sample for measuring a hot creep and measuring its expansion coefficient under a load at 1,500° C. under the above-described condition according to JIS R2658 were described in Tables 4 to 6.

Each of the samples was subjected to a corrosion test by the rotating drum method by oxygen-propane heating. The corrosion test was carried out under a condition at 1,650° C. for 4 hours by using a synthetic slag containing 8% by mass of $SiO_2$, 32% by mass of $Fe_2O_3$, 52% by mass of CaO, 4% by mass of MgO and 4% by mass of MnO as a corrosive material. The corrosive material was exchanged every one hour. After the test, the sample was collected, cut in the center thereof in the longitudinal direction and measured for the slag infiltration depth and the corrosion depth. The results were described in Tables 4 to 6.

As shown in Tables 4 and 5, all of the Invention Examples are good in the moldability and do not cause any problem in the strength of green brick briquette. The compression strength after heating is thoroughly high and good as a brick. All of these samples have a free expansion coefficient at 1,500° C. of from 2 to 5% and an expansion coefficient under a load at 1,500° C. of not more than 1% and have a good expansion characteristic. According to this, with respect to the results of the corrosion test, in all of these samples, the slag infiltration is small to an extent that it cannot be substantially measured, and the infiltration depth is good as not more than 10 mm.

Comparative Example 1 is concerned with a brick prepared by heating at a high temperature as 1,450° C., in which the moldability is of no problem, the green brick briquette strength is slightly brittle but is not problematic, and the strength after heating is low a little. As a result of high-temperature heating, a spinel is already formed, and insufficient numerical values are exhibited on both the free expansion coefficient and the expansion coefficient under a load. It is especially important that there is no substantial difference between the free expansion coefficient and the expansion coefficient under a load; and that the characteristic feature of the invention that the large expansion following the spinel formation during the use in a kiln is absorbed in the brick and made minute is not observed. As a result, the slag infiltration depth was large, the corrosion depth was very large, and cracks were observed in the sample after the test.

Comparative Example 2 is concerned with a brick using a phenol resin as the binder, in which the moldability is of no problem; the green brick briquette strength is good, and the strength after heating is not substantially problematic. However, since the phenol resin as the binder is carbonized on the way of high-temperature heating so that carbon remains, nevertheless alumina and magnesia are used as raw materials, it is noted that the free expansion coefficient is not large and that the sufficient formation of a spinel is hindered. Simultaneously, the expansion coefficient under a load does not largely differ from the free expansion coefficient, and likewise Comparative Example 1, minuteness utilizing the expansion following the spinel formation is not generated. According to the results of the corrosion test, in comparison with Comparative Example 1, both the slag infiltration and the corrosion depth are small due to the effect that carbon by the phenol resin binder is matrix distributed, but it can be said that the Invention Examples are much better.

Comparative Example 3 is concerned with one using a coarse particle for the magnesia raw material. Though Table 3 describes "O", a magnesia raw material of from 3 to 1 mm was used. In that case, nevertheless the MgO content and the $SiO_2$ and $(Na_2O+K_2O)$ contents fall within the scope of the invention, since the particle size is large, the free expansion amount is abnormally large; the expansion coefficient under a load is also large; the expansion of the spinel formation cannot be absorbed; and the formation of a spinel-containing minute layer is poor. As a result, in the corrosion test, both the slag infiltration and the corrosion amount were a large value. After the corrosion test, a number of large cracks were observed in the sample, and the infiltration and corrosion amounts could be somehow measured to the very limit. In case of a brick of a considerably larger size than the test sample, as seen in actual kilns, it is considered that breakage or exfoliation following the cracks is generated.

Comparative Example 4 is concerned with a phosphate bond brick using a magnesia raw material having a coarse particle size. Also, the contents of $SiO_2$ and $(Na_2O+K_2O)$ are lower than those which are desirable in the invention. This phosphate bond brick is remarkable in the attachment of the rammed earth onto the liner surface at the time of molding, and its actual manufacture is difficult. Also, it was judged that the strength of the green brick briquette was slightly brittle. The free expansion coefficient at 1,500° C. is a large value reflecting the spinel formation reaction due to the coarse magnesia raw material. On the other hand, the expansion coefficient under a load was a large value not substantially different from the free expansion coefficient because of shortage of $SiO_2$ and $(Na_2O+K_2O)$. For that reason, though it was attempted to perform the corrosion test, large cracks were generated to cause breakage during the test for a potential reason that the strength of the sample was slightly low. Therefore, the evaluation could not be made.

Comparative Example 5 is concerned with one using a cement the same as in a castable material. The rammed earth became in a dried-out state within a short period of time after kneading, and decent molding could not be achieved. That is, even by performing a lot of tightening by using a friction press, a sufficient pack bulk specific gravity was not obtained. Also, an edge defect was caused at the time of removal from a molding frame, lamination was easily generated, and after attempting to perform molding several times, a sample brick was obtained with difficulty. However, the green brick briquette of this brick did not substantially have strength, usual handling was impossible, and it was in a state that it became collapsed unless the closest attention was paid. Though the free expansion coefficient is a properly large value, the expansion under a load is too large because of shortage of $SiO_2$ and ($Na_2O+K_2O$). Since the strength of the brick is low, and the expansion is not largely absorbed at the time of temperature rise, the brick collapsed in the rotating drum test apparatus, whereby the test could not be achieved.

Comparative Example 6 was good with respect to the moldability, the strength of green brick briquette and the strength after heating. However, since $SiO_2$ and ($Na_2O+K_2O$) were large, the corrosion depth was large in the corrosion test.

Figure 2:
FIG. 2 is a cut surface of Comparative Example 1 after a corrosion test.

As one example of the results of the corrosion test of the refractory bricks of the invention and the Comparative Examples, a cut surface of Invention Example 2 is shown in FIG. 1, and a cut surface of Comparative Example 1 is shown in FIG. 2.

The brick of Invention Example 2 as shown in Table 1 which is the refractory brick of the invention was used for sidewall lining of a ladle for steel making. In this ladle, a high-alumina brick of a conventional class having an $Al_2O_3$ content of 85% by mass was used, and at that time, the ladle life was approximately 200 ch. In order to enhance this life, an alumina-spinel brick was tested, and the life was enhanced to 250 ch. When the refractory brick of the invention was lined on the same ladle for steel making, the life was largely enhanced to 398 ch. Moreover, in the alumina-spinel brick, since the surface exfoliation to be caused due to the slag infiltration layer is generated several times on the way of the use, it is difficult to estimate the residual thickness, and there was anxiety about its application. However, according to the alumina-magnesia refractory brick of the invention, an exfoliation phenomenon was not observed at all, and stable application of a ladle was possible.

The invention claimed is:

1. A refractory brick prepared by using an alumina raw material and a magnesia raw material containing 90% by mass or more of fine powder of not more than 0.5 mm and containing particles of which particle size exceeds 90 μm, adding silica sand, a silica stone powder, an agalmatolite powder, silica flour or a refractory clay singly or in admixture, press molding and then heat treating at 100° C. or higher and not higher than 1,150° C., the refractory brick containing $Al_2O_3$ and MgO in a total sum of 90% by mass or more, from 4 to 16% by mass of MgO, from 0.5 to 5% by mass of $SiO_2$, and $Na_2O$ and $K_2O$ in a total sum of from 0.3 to 2% by mass, with the remainder being inevitable impurities and $Al_2O_3$ and having a free expansion coefficient at 1,500° C. of from 2 to 5% and an expansion coefficient under a load of 1 MPa of from −6 to 1%.

2. The refractory brick according to claim 1, containing neither carbon nor an organic material in which carbon remains at 1,200° C. or higher and having a CaO content of less than 0.5% by mass.

\* \* \* \* \*